United States Patent
Nakagawa

(10) Patent No.: US 12,130,949 B2
(45) Date of Patent: Oct. 29, 2024

(54) INSPECTION APPARATUS, INSPECTION METHOD AND PROGRAM

(71) Applicant: Nippon Telegraph and Telephone Corporation, Tokyo (JP)

(72) Inventor: Yoshihide Nakagawa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 149 days.

(21) Appl. No.: 17/795,304

(22) PCT Filed: Jan. 27, 2020

(86) PCT No.: PCT/JP2020/002671
§ 371 (c)(1),
(2) Date: Jul. 26, 2022

(87) PCT Pub. No.: WO2021/152647
PCT Pub. Date: Aug. 5, 2021

(65) Prior Publication Data
US 2023/0088671 A1 Mar. 23, 2023

(51) Int. Cl.
*G06F 21/64* (2013.01)
(52) U.S. Cl.
CPC .................................. *G06F 21/64* (2013.01)
(58) Field of Classification Search
None
See application file for complete search history.

(56) References Cited

U.S. PATENT DOCUMENTS

| | | | | |
|---|---|---|---|---|
| 2015/0067863 A1* | 3/2015 | Billa | ................... | H04L 63/0245 726/24 |
| 2015/0324457 A1* | 11/2015 | McLean | .............. | G06F 16/3344 707/758 |
| 2016/0028766 A1* | 1/2016 | Valgenti | .............. | H04L 63/1416 726/23 |
| 2017/0352348 A1* | 12/2017 | Wang | ................... | G10L 15/197 |

OTHER PUBLICATIONS

Liu et al., "Firewall Compressor: An Algorithm for Minimizing Firewall Policies," 27th Annual IEEE Conference on Computer Communications (INFOCOM), Apr. 2008, pp. 691-699.

* cited by examiner

*Primary Examiner* — Anh Nguyen
(74) *Attorney, Agent, or Firm* — Fish & Richardson P.C.

(57) ABSTRACT

An inspection device supports work related to ensuring security by including: a conversion unit that converts a regular expression of a first signature into a first representation by a nondeterministic finite automaton and converts a regular expression of a second signature into a second representation by a nondeterministic finite automaton; a determination unit that determines the presence or absence of an inclusive relationship between the first representation and the second representation; and an output unit that when a result of determination by the determination unit indicates that the first representation and the second representation have an inclusive relationship, outputs information indicating that the first signature and the second signature have the inclusive relationship.

5 Claims, 8 Drawing Sheets

INSPECTION APPARATUS, INSPECTION METHOD AND PROGRAM

CROSS-REFERENCE TO RELATED APPLICATIONS

This application is a National Stage application under 35 U.S.C. § 371 of International Application No. PCT/JP2020/002671, having an International Filing Date of Jan. 27, 2020, the disclosure of which is considered part of the disclosure of this application, and is incorporated by reference in its entirety into this application.

TECHNICAL FIELD

The present invention relates to an inspection device, an inspection method, and a program.

BACKGROUND ART

In the conventional field of security operations for network communication, there have been techniques in designing and applying security settings (access list, signature) of a security device: a technique of inspecting whether a security setting makes a false detection for a user input for a service to be protected (false detection presence/absence inspection technique); and a technique of detecting redundant security settings among a plurality of security devices (redundant security setting detection technique).

The conventional false detection presence/absence inspection technique includes: a staging method in which security device settings are changed to execute interruption after performing monitoring for a fixed period of time and checking that an influence of false detection is minimal; and a vulnerability scanning method in which a vulnerability scanning is actually performed for a service to be protected and whether there is false detection is checked.

In addition, the redundant security setting detection technique includes a firewall access list redundancy detection technique (Non-Patent Literature 1).

CITATION LIST

Patent Literature

Non-Patent Literature 1: A. Liu et al., "Firewall Compressor: An Algorithm for Minimizing Firewall Policies," the 27th Annual IEEE Conference on Computer Communications (INFOCOM), pages 176-180, April, IEEE, 2008.

SUMMARY OF THE INVENTION

Technical Problem

However, the conventional false detection presence/absence inspection technique (staging method, vulnerability scanning method) has: a problem with comprehensiveness in which it cannot be determined that there is no false detection for all inputs from users; and a problem with inspection time in which since checking is performed using actual communication in inspection, it takes several days to several months.

In addition, the redundant security setting detection technique is applied only to part of the security settings (access list) and does not take signatures into consideration.

The present invention has been made in view of the above points, and it is an object of the present invention to support work related to ensuring security.

Means for Solving the Problem

In order to solve the above problems, an inspection device includes: a conversion unit that converts a regular expression of a first signature into a first representation by a nondeterministic finite automaton and converts a regular expression of a second signature into a second representation by a nondeterministic finite automaton; a determination unit that determines presence or absence of an inclusive relationship between the first representation and the second representation; and an output unit that when a result of determination by the determination unit indicates that the first representation and the second representation have an inclusive relationship, outputs information indicating that the first signature and the second signature have the inclusive relationship.

Effects of the Invention

Work related to ensuring security can be supported.

DESCRIPTION OF EMBODIMENTS

Figure 1:
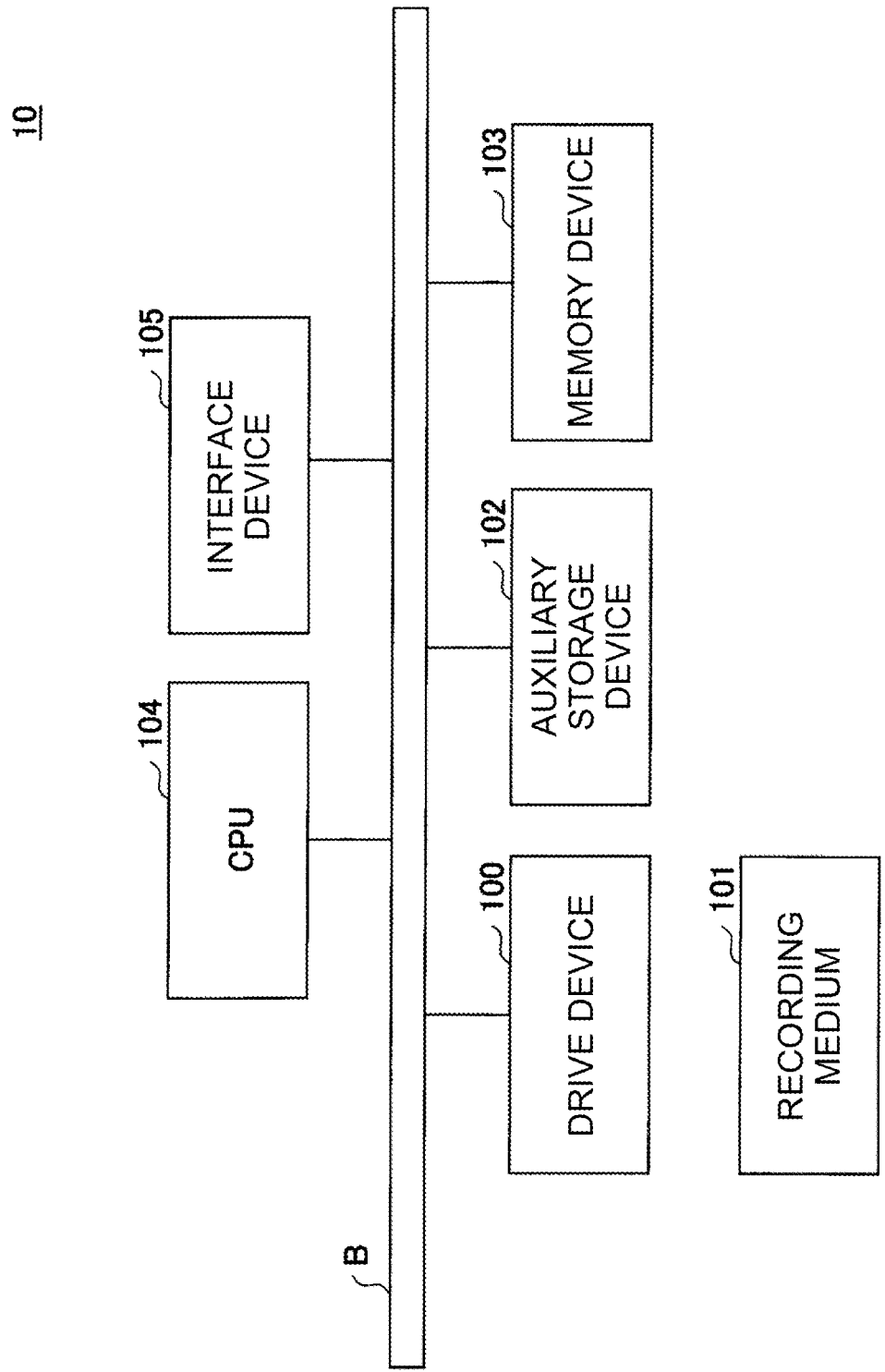
FIG. 1 is a diagram illustrating a hardware configuration example of an inspection device 10 according to an embodiment of the present invention.

Hereinafter, embodiments of the present invention will be described with reference to drawings. FIG. 1 is a diagram illustrating a hardware configuration example of an inspection device 10 according to an embodiment of the present invention. The inspection device 10 in FIG. 1 includes a drive device 100, an auxiliary storage device 102, a memory device 103, a CPU 104, an interface device 105, and the like that are mutually connected with each other via a bus B.

A program that implements processing in the inspection device 10 is provided by a recording medium 101 such as a CD-ROM. When the recording medium 101 in which the program is stored is set in the drive device 100, the program is installed in the auxiliary storage device 102 through the drive device 100 from the recording medium 101. It is noted that the program is not necessarily installed from the recording medium 101 and may be downloaded from another computer via a network. The auxiliary storage device 102 stores the installed program and also stores necessary files, data, and the like.

When an instruction to start the program is provided, the memory device 103 reads the program from the auxiliary storage device 102 and stores it. The CPU 104 executes functions related to the inspection device 10 according to the program stored in the memory device 103. The interface device 105 is used as an interface for connection to the network.

Figure 2:
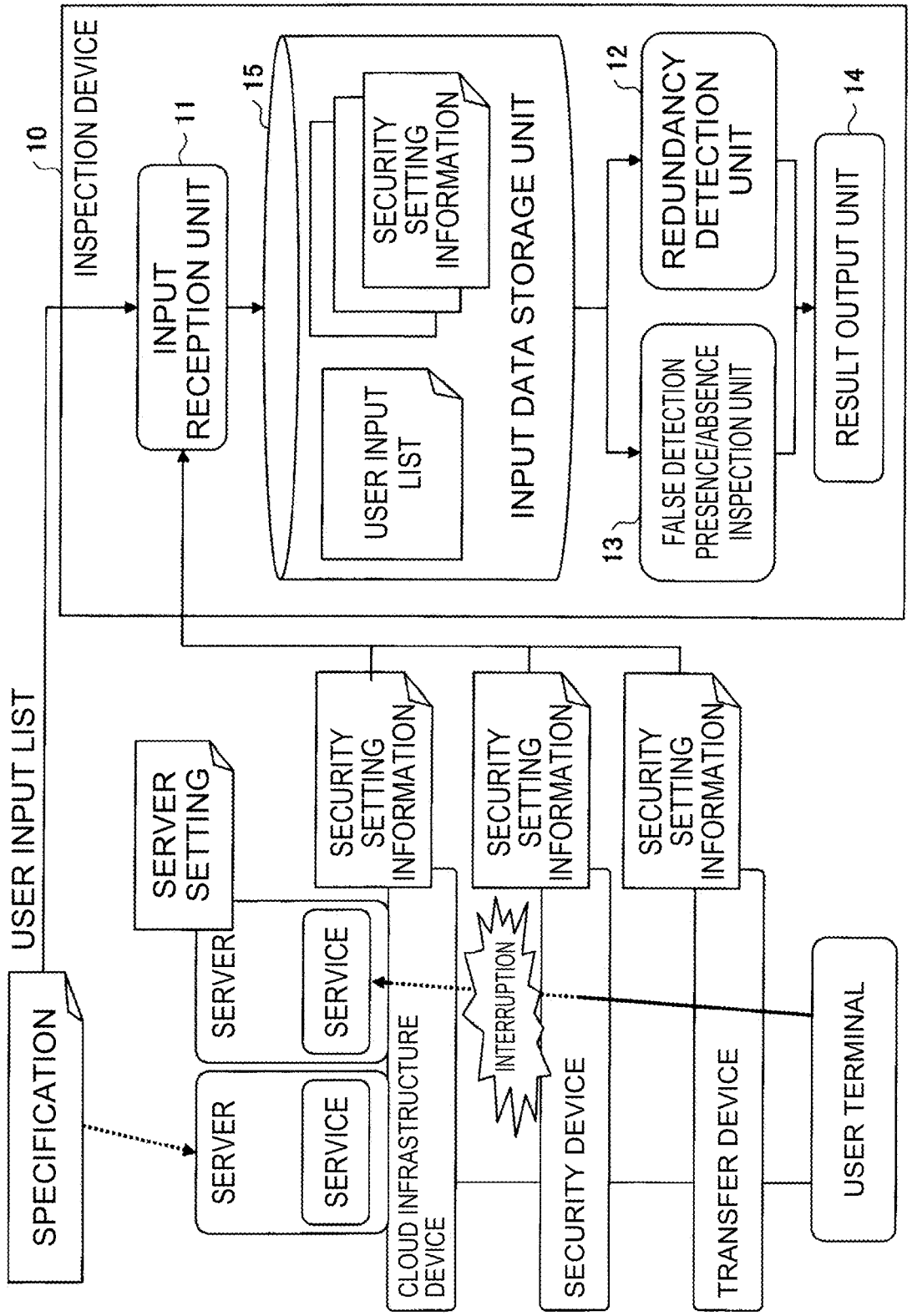
FIG. 2 is a diagram illustrating a functional configuration example of the inspection device 10 according to the embodiment of the present invention.

FIG. 2 is a diagram illustrating a functional configuration example of the inspection device 10 according to the embodiment of the present invention. In FIG. 2, the inspection device 10 includes an input reception unit 11, a redundancy detection unit 12, a false detection presence/absence inspection unit 13, and a result output unit 14, etc. Each of the units is implemented by processing which one or more of the programs installed in the inspection device 10 cause the CPU 104 to execute. In addition, the inspection device 10 uses an input data storage unit 15. The input data storage unit 15 can be implemented, for example, by using the auxiliary storage device 102 or a storage device or the like that is connectable to the inspection device 10 via a network.

The input reception unit 11 receives, from a plurality of transfer devices, a plurality of security devices, one or more cloud infrastructure devices, and the like on a certain network, an input of security setting information which has been set in each of the devices, for example, via the network; and stores the received security setting information in the input data storage unit 15. In addition, the input reception unit 11 receives an input of a user input list related to a service working on a server which has been started on a cloud infrastructure device on the network, for example, from an administrator of the inspection device 10; and stores it in the input data storage unit 15.

The user input list is a list of a collection of requests that can be transmitted from a user terminal to a service by an input by a user to the service (hereinafter referred to as "user input"). For example, when the service is a web service, the user input has an HTTP request format. As one example, a request to be transmitted from a user terminal to a web service in response to an input of a user ID and password to a login screen for the web service has the following format:
GET http://example.com/login.php?id=[userinput]&password=[user-input]HTTP/1.1

Here, the part of [userin-put] is a variable part that is input by a user. In each user input that constitutes the user input list, such a variable part is replaced with a regular expression. For example, when an input restriction of requiring eight or more single-byte alphanumeric characters is imposed on a user ID and password as a web service specification, a user input part is replaced with a regular expression in accordance with the input restriction and a user input is created as follows:
GET
http:¥/¥/example.com¥/login.php¥?id=¥w{8, }¥&password==¥w{8,}HTTP¥/1.1

In the user input, [user-input] in its original request has been replaced with "¥w{8,}". Here, "¥w" is a symbol called a meta character that has a special meaning in a regular expression and means any one single-byte alphanumeric character. Thus, "¥w{8,}" means any eight single-byte alphanumeric characters. In addition, in the user input, "¥" has been added before "/", "?" and "&" in its original request. The "¥" has a function of allowing "/", "?", and "&", which are meta characters in a regular expression, to be interpreted as normal characters (that is, avoiding it from being interpreted as meta characters) in the user input. The input reception unit 11 receives an input of the list of user inputs which have been converted into such a format by the administrator (that is, a user input list), and stores the user input list in the input data storage unit 15.

The security setting information is an access list, signature, or the like. The access list, which is also referred to as an ACL (an access control list), is a list of information indicating approval/disapproval of communication according to information that specifies a transmission source and a destination. The signature is text data indicating a pattern of attack on communication. The signature may be originally set by a regular expression or may be set in a different format. In the case of the latter, the input reception unit 11 receives an input of a signature after conversion into a regular expression by the administrator. Thus, all signatures that are stored in the input data storage unit 15 have a regular expression format.

The redundancy detection unit 12 compares pieces of security setting information stored in the input data storage unit 15 with each other, and detects redundant settings (having redundant parts). The redundancy detection unit 12 outputs a detection result to the result output unit 14. As for detecting redundancy between access lists, a known technique is used. As for detecting redundancy between signatures, it is performed as illustrated in FIG. 3.

Figure 3:
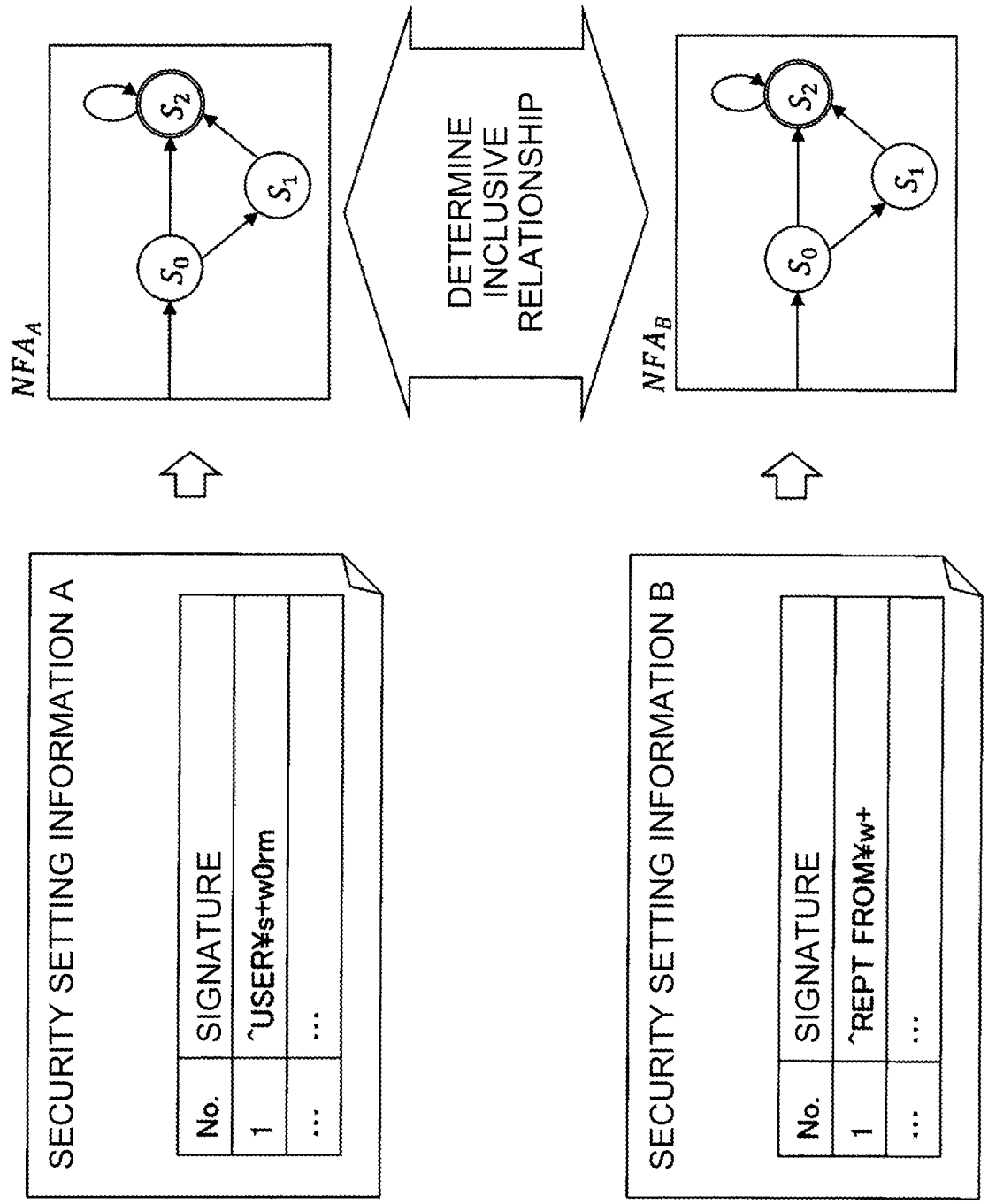
FIG. 3 is an illustration for describing a method of detecting redundancy between signatures.

FIG. 3 is an illustration for describing a method of detecting redundancy between signatures. As illustrated in FIG. 3, the redundancy detection unit 12 converts, into a representation of a non-deterministic finite automaton (hereinafter, referred to as "NFA"), each of: a signature using a regular expression which is included in security setting information A that has been set in one security device or the like; and a signature using a regular expression which is included in security setting information B that set in another security device or the like. In FIG. 3, a result of conversion of the signature included in the security setting information A into an NFA is represented as $NFA_A$ and a result of conversion of the signature included in the security setting information B into an NFA is represented as $NFA_B$. The redundancy detection unit 12 determines the presence or absence of an inclusive relationship between two signatures, based on comparison between $NFA_A$ and $NFA_B$. The redundancy detection unit 12 determines, if there is an inclusive relationship, that there is redundancy between the two signatures.

The false detection presence/absence inspection unit 13 compares a user input list with a signature and inspects (determines) the presence or absence of a user input that can be erroneously detected by the signature as an attack. The false detection presence/absence inspection unit 13 outputs an inspection (determination) result to the result output unit 14.

Figure 4:
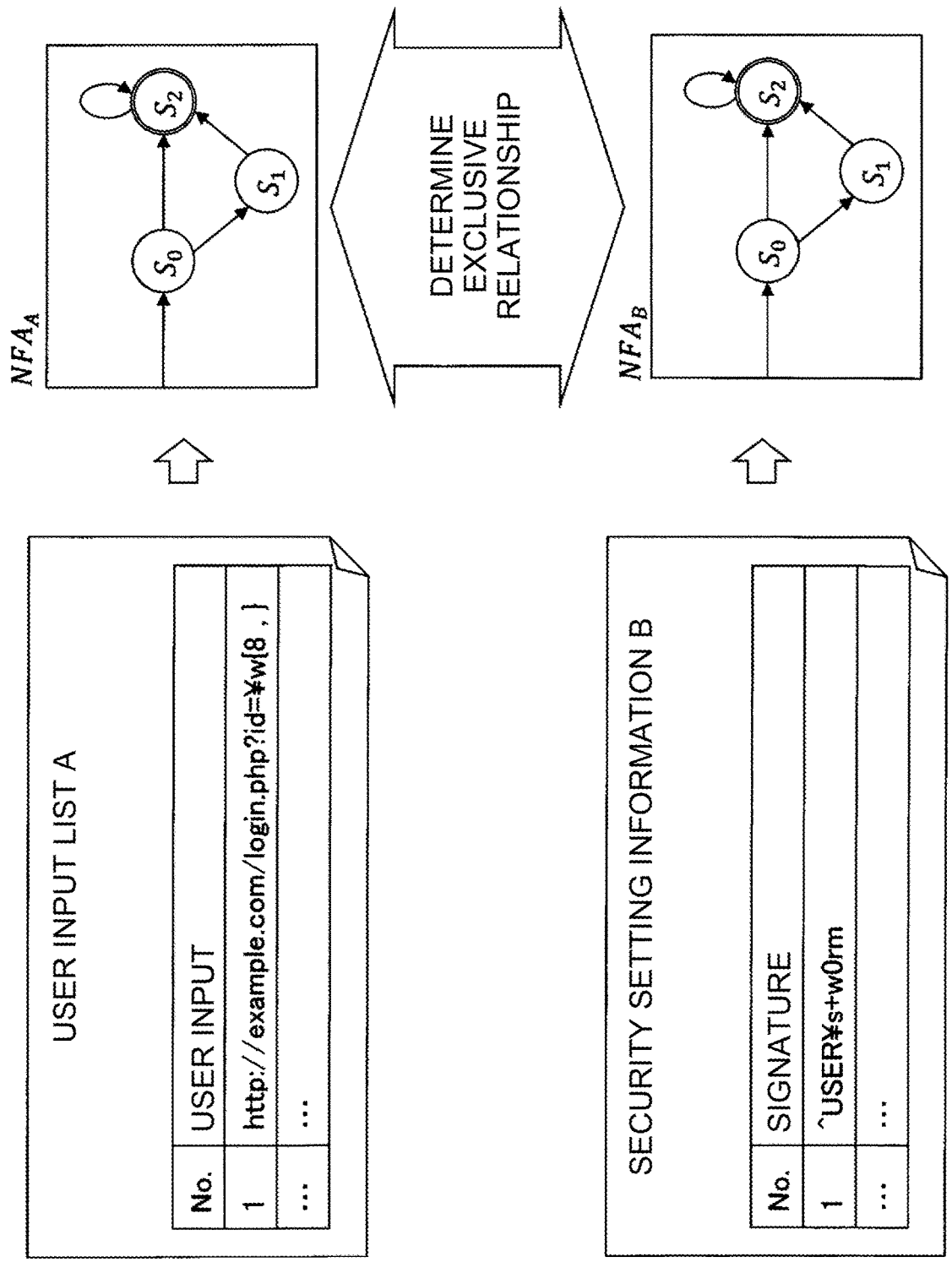
FIG. 4 is an illustration for describing a method of determining presence or absence of user input that can be erroneously detected by a signature.

FIG. 4 is an illustration for describing a method of determining the presence or absence of a user input that can be erroneously detected by a signature. As illustrated in FIG. 4, the false detection presence/absence inspection unit 13 converts, into an NFA representation, each of: a user input using a regular expression which is included in a user input list A that has been set in one security device or the like; and a signature using a regular expression which is included in the security setting information B that has been set in another security device or the like. In FIG. 4, a result of conversion of a user input included in the user input list A into an NFA is represented as $NFA_A$ and a result of conversion of a signature included in the security setting information B into an NFA is represented as $NFA_B$. The false detection presence/absence inspection unit 13 determines whether or not there is an exclusive relationship between the user input and the signature, based on comparison between $NFA_A$ and $NFA_B$. The false detection presence/absence inspection unit 13 determines, if there is no exclusive relationship, that the user input is erroneously detected by the signature.

The result output unit 14 outputs information which is output from the redundancy detection unit 12 and the false detection presence/absence inspection unit 13, for example, in a form that can be recognized by a security operator or the like. Display on a display device, output to a file, sending by electronic mail, and the like are examples of output by the result output unit 14.

Figure 5:
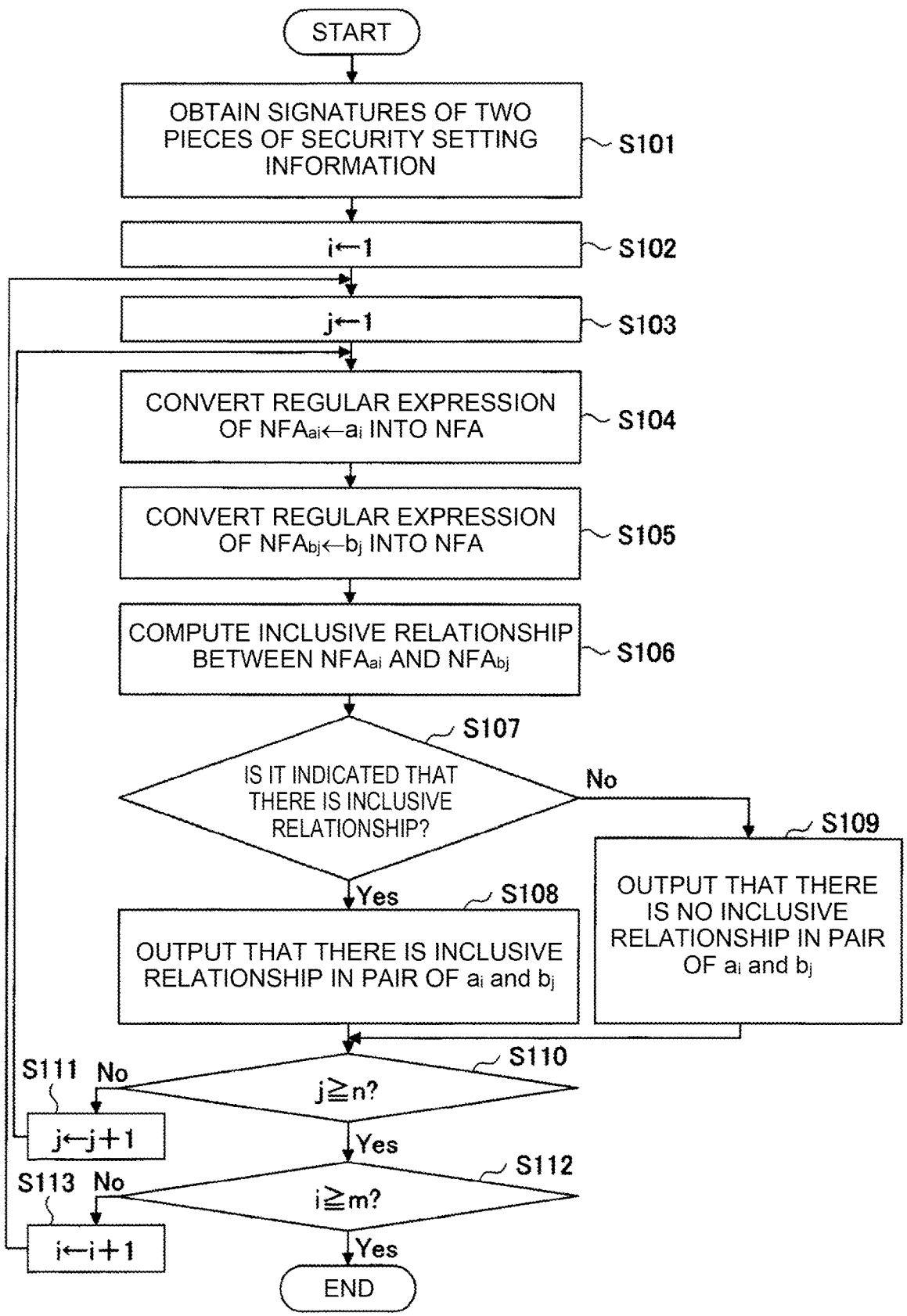
FIG. 5 is a flowchart for describing one example of a processing procedure that is executed by a redundancy detection unit 12.

Hereafter, a processing procedure executed by the inspection device 10 will be described. FIG. 5 is a flowchart for describing one example of a processing procedure that is executed by the redundancy detection unit 12.

In the step S101, the redundancy detection unit 12 obtains, from the input data storage unit 15, both a signature list $sig_A=[a_1, a_2, \ldots, a_m]$ that is included in the security setting information A related to a server or a service to be inspected and a signature list $sig_B=[b_1, b_2, \ldots, b_n]$ that is included in the security setting information B related to the server or the service. Here, the security setting information A refers to security setting information that is obtained from one security device or transfer device; and the security setting information B refers to security setting information that is obtained from another security device or another transfer device.

Subsequently, the redundancy detection unit 12 substitutes 1 for a variable i (S102) and substitutes 1 for a variable j (S103). The variable i is a variable for distinguishing between signatures included in the signature list $sig_A$. The variable j is a variable for distinguishing between signatures included in the signature list $sig_B$.

Subsequently, the redundancy detection unit 12 converts the regular expression of a signature $a_i$, ($1 \leq i \leq m$) into an NFA representation (S104). Hereinafter, the NFA representation of the regular expression of the signature $a_i$ is shown as $NFA_{ai}$.

Subsequently, the redundancy detection unit 12 converts the regular expression of a signature $b_j$, ($1 \leq j \leq n$) into an NFA representation (S105). Hereinafter, the NFA representation of the regular expression of the signature $b_j$ is shown as $NFA_{bj}$.

Subsequently, the redundancy detection unit 12 executes computation processing for determining the presence or absence of an inclusive relationship between the $NFA_{ai}$ and $NFA_{bj}$ (S106). The computation processing is performed based on a known technique (for example, Japanese Patent Laid-Open No. 2006-185176).

If a result of the computation processing indicates that there is an inclusive relationship (that is, $NFA_{ai} \subseteq NFA_{bj}$, or $NFA_{bj} \subseteq NFA_{ai}$ is established) (Yes at S107), the signature $a_i$ overlaps with the signature $b_j$ and therefore, the redundancy detection unit 12 outputs, together with a pair of the signature $a_i$ and the signature $b_j$, information indicating that there is an inclusive relationship (an overlap) between the pair, to the result output unit 14 (S108). On the contrary, if a result of the computation processing indicates that there is no inclusive relationship (No at S107), the redundancy detection unit 12 outputs, together with a pair of the signature $a_i$ and the signature $b_j$, information indicating that there is no inclusive relationship between the pair, to the result output unit 14 (S109). It should be noted that the step S109 is not necessarily required to be executed.

Subsequently, the redundancy detection unit 12 determines whether or not a value of the variable j is n or greater (S110). If j is smaller than n (No at S110), the redundancy detection unit 12 adds 1 to j (S111) and repeats step S104 and the subsequent steps. If j is n or greater (Yes at S110), the redundancy detection unit 12 determines whether or not a value of the variable i is m or greater (S112). If i is smaller than m (No at S112), the redundancy detection unit 12 adds 1 to i (S113) and repeats step S103 and the subsequent steps. If i is m or greater (Yes at S113), the redundancy detection unit 12 ends processing.

When there are three or more security devices or transfer devices in which security information related to a server or a service to be inspected has been set, the processing procedure in FIG. 5 is executed for each of all combinations between the three or more devices, with regard to two signature lists related to the combination.

Figure 6:
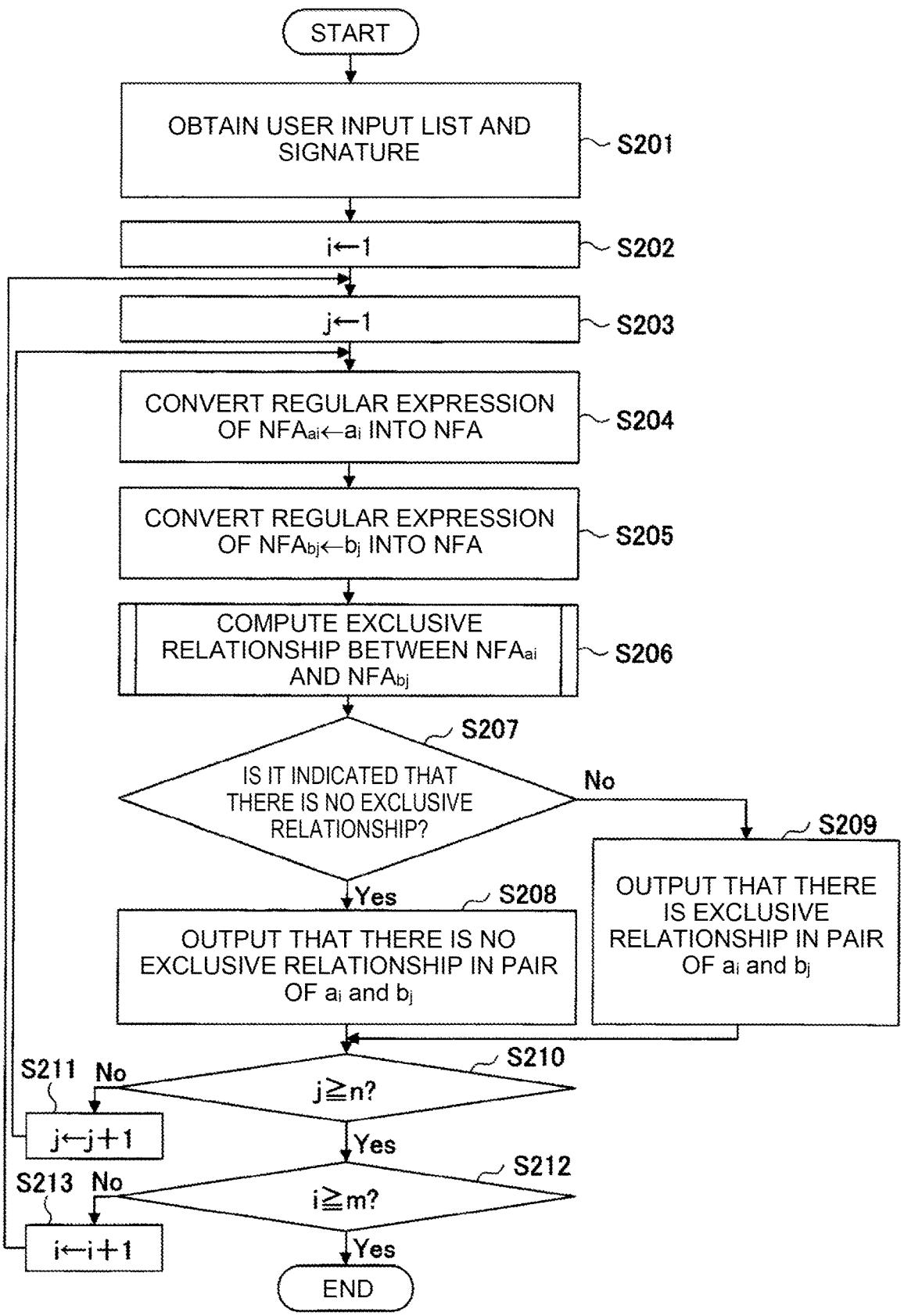
FIG. 6 is a flowchart for describing one example of a processing procedure that is executed by a false detection presence/absence inspection unit 13.

FIG. 6 is a flowchart for describing one example of a processing procedure that is executed by the false detection presence/absence inspection unit 13.

In the step S201, the false detection presence/absence inspection unit 13 obtains, from the input data storage unit 15, both a user input list $inp_A=[a_1, a_2, \ldots, a_m]$ that is related to a server or a service to be inspected and a signature list $sig_B=[b_1, b_2, \ldots, b_n]$ that is included in security setting B related to the server or the service.

Subsequently, the false detection presence/absence inspection unit 13 substitutes 1 for a variable i (S202) and substitutes 1 for a variable j (S203). The variable i is a variable for distinguishing between user inputs included in the user input list $inp_A$. The variable j is a variable for distinguishing between signatures included in the signature list $sig_B$.

Subsequently, the false detection presence/absence inspection unit 13 converts the regular expression of a user input $a_i$, ($1 \leq i \leq m$) into an NFA representation (S204). Hereinafter, the NFA representation of the regular expression of the user input $a_i$ is shown as $NFA_{ai}$.

Subsequently, the false detection presence/absence inspection unit 13 converts the regular expression of a signature $b_j$, ($1 \leq j \leq n$) into an NFA representation (S205) Hereinafter, the NFA representation of the regular expression of the signature $b_j$ is shown as $NFA_{bj}$.

Subsequently, the false detection presence/absence inspection unit 13 executes computation processing for determining the presence or absence of an exclusive relationship between the $NFA_{ai}$ and $NFA_{bj}$ (S206). In the computation processing, the false detection presence/absence inspection unit 13 generates a product automaton of $NFA_{ai}$ and $NFA_{bj}$ and determines the presence or absence of an exclusive relationship based on whether or not there is a final state in the product automaton. If there is no final state in the product automaton, the false detection presence/absence inspection unit 13 determines that there is exclusive relationship, or if there is final state, it determines that there is no exclusive relationship.

If a result of the computation processing indicates that there is no exclusive relationship (that is, $NFA_{ai} \subseteq NFA_{bj}^c$ is not established) (Yes at S207), the user input $a_i$ is erroneously detected by the signature $b_j$, and therefore, the false detection presence/absence inspection unit 13 outputs, together with a pair of the user input $a_i$ and the signature $b_j$, information indicating that there is an inclusive relationship between the pair (a possibility of false detection), to the result output unit 14 (S208). On the contrary, if a result of the computation processing indicates that there is an exclusive relationship (that is, $NFA_{ai} \subseteq NFA_{bj}^{\ c}$ is established) (No at S207), the false detection presence/absence inspection unit 13 outputs, together with a pair of the user input $a_i$ and the signature $b_j$, information indicating that there is no inclusive relationship between the pair (no possibility of false detection), to the result output unit 14 (S209).

Subsequently, the false detection presence/absence inspection unit 13 determines whether or not a value of the variable j is n or greater (S210). If j is smaller than n (No at S210), the false detection presence/absence inspection unit 13 adds 1 to j (S211) and repeats step S204 and the subsequent steps. If j is n or greater (Yes at S210), the false detection presence/absence inspection unit 13 determines whether or not a value of the variable i is m or greater (S212). If i is smaller than m (No at S212), the false detection presence/absence inspection unit 13 adds 1 to i (S213) and repeats step S203 and subsequent steps. If i is m or greater (Yes at S213), the false detection presence/absence inspection unit 13 ends processing.

When there are three or more security devices or transfer devices in which security information related to a server or a service to be inspected has been set, the processing procedure in FIG. 6 is executed for each of all combinations between the three or more devices, with regard to a user input list and a signature list which are related to the combination.

Figure 7:
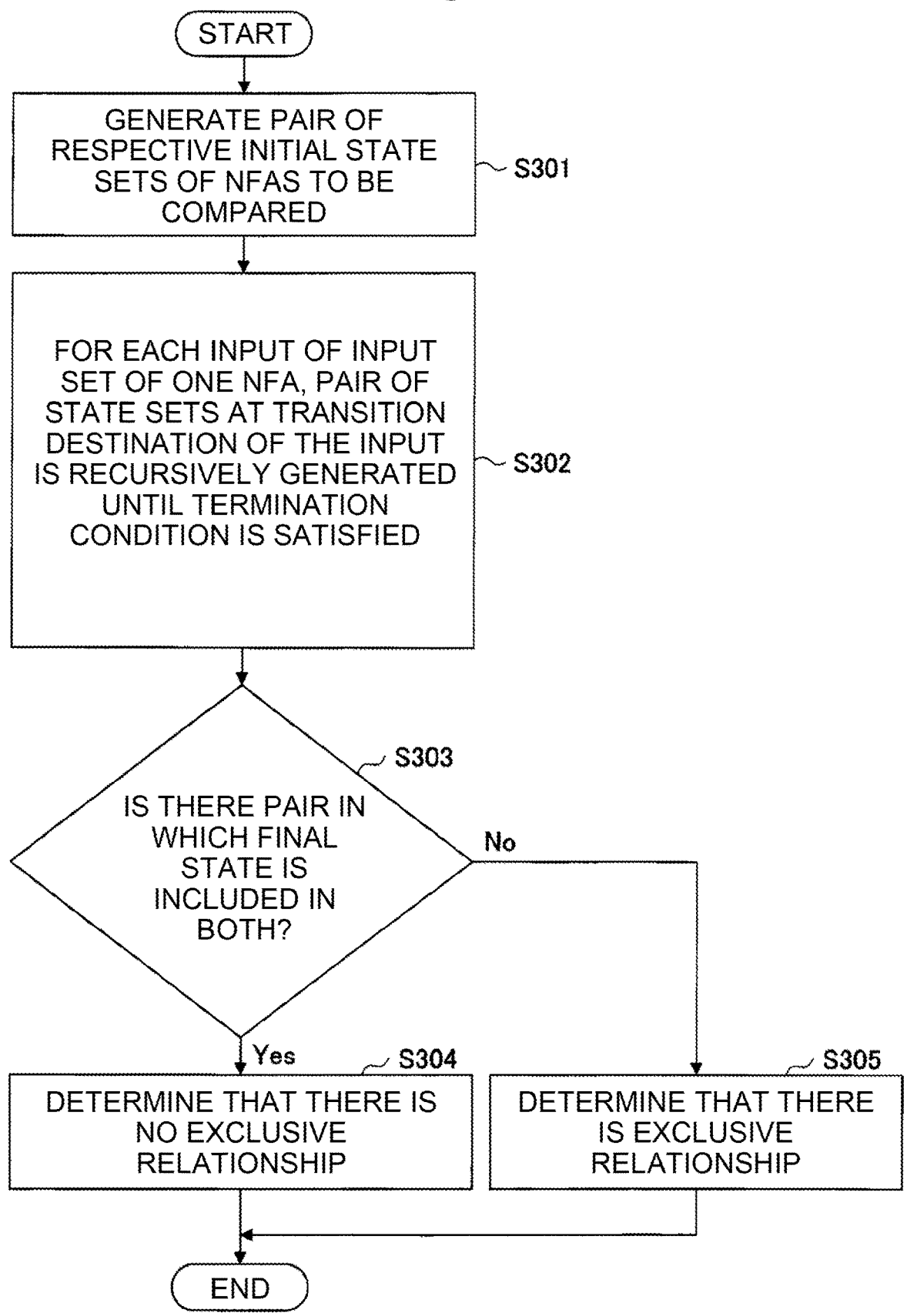
FIG. 7 is a flowchart for describing one example of computation processing for determining the presence or absence of an exclusive relationship between two NFAs.

Subsequently, details of the step S206 will be described. FIG. 7 is a flowchart for describing one example of computation processing for determining the presence or absence of an exclusive relationship between two NFAs.

In the step S301, the false detection presence/absence inspection unit 13 generates a set of initial states for each of the two NFAs to be compared. As a result, generated are a pair of: a set of initial states of one NFA (hereinafter, referred to as "$NFA_A$"); and a set of initial states of the other NFA (hereinafter, referred to as "$NFA_B$"). Here, the initial states also include the state of a transition destination of an s transition from an initial state.

Figure 8:
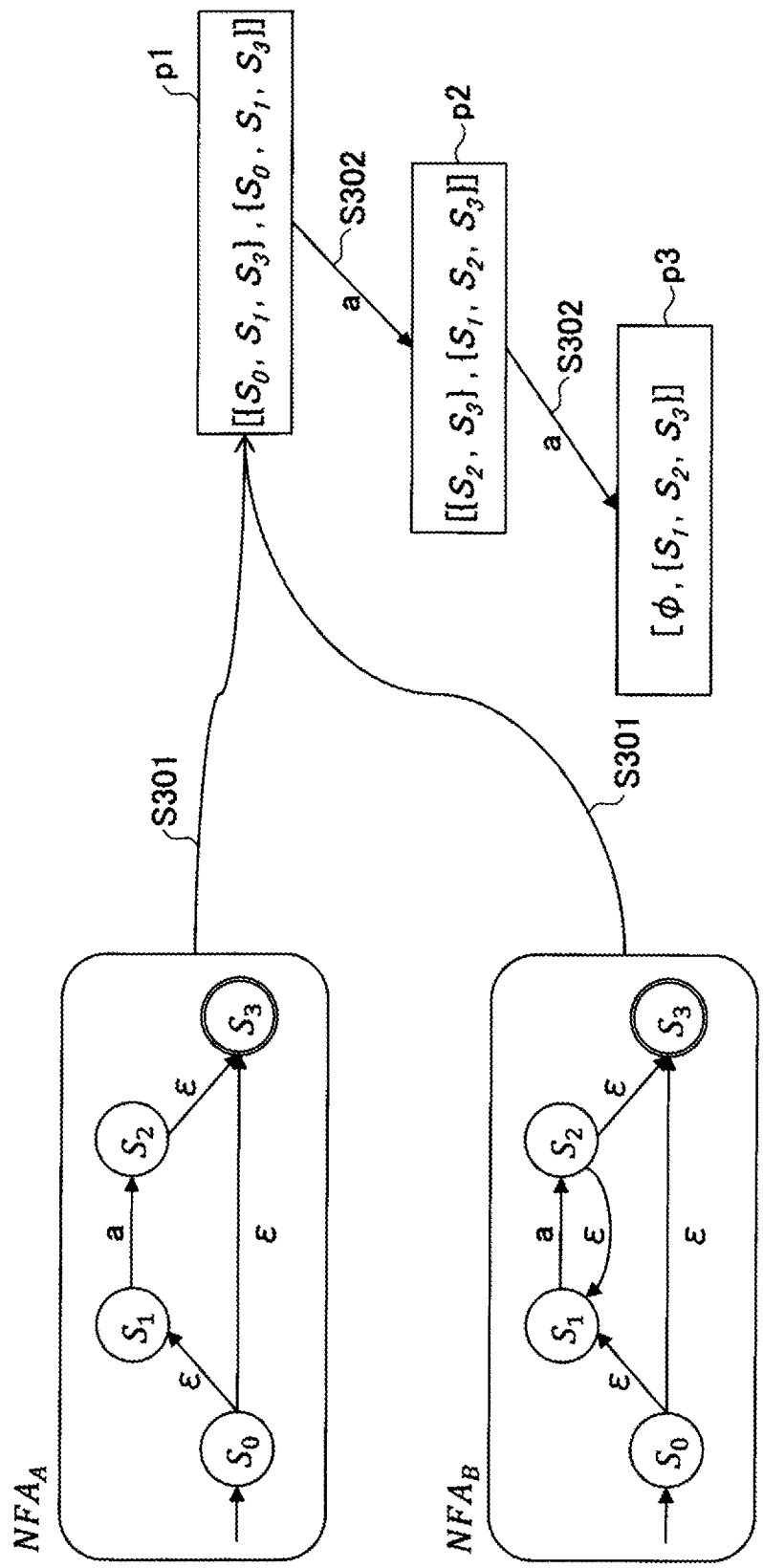
FIG. 8 is a diagram for supplementing the description of one example of computation processing for determining the presence or absence of an exclusive relationship between two NFAs.

FIG. 8 is a diagram for supplementing the description of one example of computation processing for determining the presence or absence of an exclusive relationship between two NFAs. On the left side in FIG. 8, an $NFA_A$ and $NFA_B$ are illustrated. In the $NFA_A$ in FIG. 8, the initial state is $S_0$. In addition, the state of a transition destination of an s transition from $S_0$ is $S_1$ and $S_3$. Therefore, as for the $NFA_A$, $\{S_0, S_1, S_3\}$ is generated as a set of initial states. In the $NFA_B$ in FIG. 8, the initial state is $S_0$. In addition, the state of a transition destination of an ε transition from $S_0$ is $S_1$ and $S_3$. Therefore, as for the $NFA_B$, $\{S_0, S_1, S_3\}$ is generated as a set of initial states. As a result, in the example of FIG. 8, a pair of p1([$\{S_0, S_1, S_3\}$, $\{S_0, S_1, S_3\}$]) illustrated in FIG. 8 is generated at the step S301. It should be noted that in the representation of the pair, a set on the left side indicates a state set of the $NFA_A$ and a set on the right side indicates a state set of the $NFA_B$.

Subsequently to the step S301, the false detection presence/absence inspection unit 13 recursively generates, for each input constituting the input set of the $NFA_A$, a pair of state sets at a transition destination of the input to a pair of the last state sets until a termination condition is satisfied (S302). Here, the input set of the $NFA_A$ includes only "a" in FIG. 8. Therefore, in the example in FIG. 8, a pair of state sets at a transition destination in a case where "a" is input to a pair of the last state sets is recursively generated until a predetermined condition is satisfied.

A pair of last state sets at the start time of the step S302 is a pair p1. Therefore, a state set at a transition destination (also including a transition destination of an s transition) in a case where "a" is input to each of the states in a state set of the $NFA_A$ in the pair p1 is generated; and a state set at a transition destination in "a" case where a is input to each of the states in a state set of the $NFA_B$ in the pair p1 is generated (searched for). As a result, a pair p2 in FIG. 8 is generated.

The input of "a" to a state set is recursively executed and therefore, subsequently, a state set (also including a transition destination of an s transition) in a case where "a" is input to each state set in the pair p2 is generated. As a result, a pair p3 in FIG. 8 is generated.

The termination condition for recursive processing is that "the state set on the $NFA_A$ side becomes an empty set, or the same pair as a pair of state sets at a transition destination has already occurred." In FIG. 8, the state set on the $NFA_A$ side in the pair p1 is an empty set and therefore, the termination condition is satisfied, which terminates search for a state set.

It should be noted that although the input set of the $NFA_A$ includes only "a" in FIG. 8, input candidates of an NFA are 256 Ascii characters from ¥x00 to ¥xff. Therefore, if a plurality of inputs constitutes an input set, a hierarchy for each pair is recursively generated for the plurality of inputs.

Subsequently to the step S302, the false detection presence/absence inspection unit 13 determines whether or not there is a pair in which both a state set on the $NFA_A$ side and a state set on the $NFA_B$ side include a final state, among all the pairs generated at the steps S301 and S302 (S303). In the example of FIG. 8, the final state of the $NFA_A$ is $S_3$ and the final state of the $NFA_B$ is $S_3$. Therefore, the presence or absence of the occurrence of a pair in which a state set on the $NFA_A$ side includes $S_3$ and a final state of the $NFA_B$ includes $S_3$ is determined.

If there is a relevant pair (Yes at S303), the false detection presence/absence inspection unit 13 determines that there is no exclusive relationship (S304) If there is no relevant pair (No at S303), the false detection presence/absence inspection unit 13 determines that there is an exclusive relationship (S305).

It should be noted that generation of (search for) a pair which is recursively executed at the step S302 may be terminated when a pair that satisfies the condition in the step S303 is generated. In this case, the false detection presence/absence inspection unit 13 is only required to determine that there is no exclusive relationship.

As described above, according to this embodiment, redundancy among a plurality of signatures can be detected beforehand (before application of each signature). In addition, according to this embodiment, the presence or absence of a false detection with a plurality of signatures can be detected beforehand for a plurality of user inputs. Thus, according to this embodiment, work related to ensuring security can be supported. For example, the presence or absence of a false detection for security settings and the presence or absence of redundancy can be detected in a short period of time and also with a higher coverage rate than before.

Although in the conventional redundant security setting detection technique, application is limited only to access lists, application to not only access lists but also signatures is possible according to this embodiment.

In addition, according to this embodiment, a user input that can be accepted but is rare in input (for example, an uncommon user ID, etc.) can be handled, in comparison with the conventional false detection presence/absence inspection technique (security device verification/staging).

In this embodiment, the redundancy detection unit 12 is one example of a conversion unit and a determination unit in claim 1. The false detection presence/absence inspection unit 13 is one example of a conversion unit and a determination unit in claims 2 and 3.

Although the embodiment of the present invention has been described in detail above, the present invention is not limited to such a specific embodiment; and various modifications and changes are possible without departing from the scope of the present invention described in claims.

REFERENCE SIGNS LIST

10 Inspection device
11 Input reception unit
12 Redundancy detection unit
13 False detection presence/absence inspection unit
14 Result output unit
15 Input data storage unit
100 Drive device
101 Recording medium
102 Auxiliary storage device
103 Memory device
104 CPU
105 Interface device
B Bus

The invention claimed is:

1. An inspection device comprising circuitry that executes instructions that cause performance of operations to:
convert a regular expression of a first signature into a first representation by a nondeterministic finite automaton and convert a regular expression of a second signature into a second representation by a nondeterministic finite automaton;
compare the nondeterministic finite automaton of the first representation and the nondeterministic finite automaton of the second representation;
determine, based on the comparison, presence or absence of an inclusive relationship between the first representation and the second representation, wherein the inclusive relationship indicates that the first representation is the same as or is a subset of the second representation; and
when a result of determination indicates that the first representation and the second representation have an inclusive relationship, output information indicating that the first signature and the second signature have the inclusive relationship.

2. An inspection device comprising circuitry that executes instructions that cause performance of operations to:
convert a regular expression of a user input for a service into a first representation by a nondeterministic finite automaton and convert a regular expression of a signature into a second representation by a nondeterministic finite automaton;
compare the nondeterministic finite automaton of the first representation and the nondeterministic finite automaton of the second representation;
determine, based on the comparison, presence or absence of an exclusive relationship between the first representation and the second representation, wherein the inclusive relationship indicates that the first representation is the same as or is a subset of the second representation; and
when a result of determination indicates that the first representation and the second representation do not have an exclusive relationship, output information indicating that the user input and the signature do not have an exclusive relationship.

3. The inspection device according to claim 2, wherein the presence or absence of the exclusive relationship is determined based on whether or not there is a final state in a product automaton of the first representation and the second representation.

4. An inspection method, comprising:
converting a regular expression of a user input for a service into a first representation by a nondeterministic finite automaton and converting a regular expression of a signature into a second representation by a nondeterministic finite automaton;
comparing the nondeterministic finite automaton of the first representation and the nondeterministic finite automaton of the second representation;
determining, based on the comparison, presence or absence of an exclusive relationship between the first representation and the second representation, wherein the inclusive relationship indicates that the first representation is the same as or is a subset of the second representation; and
when a result of determination indicates that the first representation and the second representation do not have an exclusive relationship, outputting information indicating that the user input and the signature do not have an exclusive relationship.

5. The inspection method according to claim 4, wherein determining the presence or absence of the exclusive relationship is based on whether or not there is a final state in a product automaton of the first representation and the second representation.

* * * * *